J. W. ROW.
Improvement in Cheese-Cutter.
No. 131,784.            Patented Oct. 1, 1872.
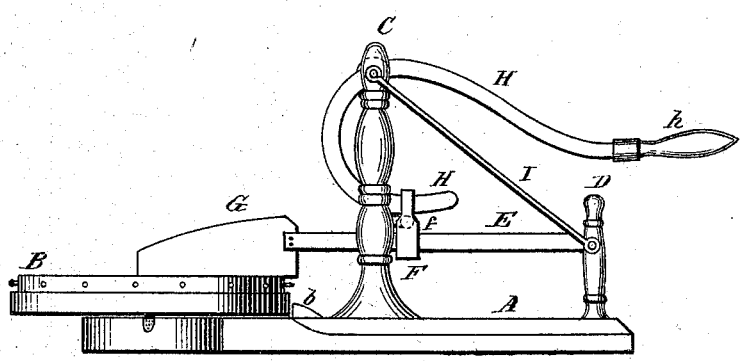
Witnesses
Elias Bruner
John Bender
Inventor
John W. Row
per J. Stauffer Att'y

UNITED STATES PATENT OFFICE.

JOHN W. ROW, OF LEWISBURG, PENNSYLVANIA.

IMPROVEMENT IN CHEESE-CUTTERS.

Specification forming part of Letters Patent No. 131,784, dated October 1, 1872.

*To all whom it may concern:*

Be it known that I, JOHN W. ROW, of Lewisburg, in Union county, in the State of Pennsylvania, have invented certain Improvements in Knives for Cutting Cheese and the like, of which the following is a specification:

The object of my invention is to provide a means of holding and revolving a cheese of ordinary size and thickness, for cutting off smooth slices (duly gaged so as to determine the weight, if need be) by means of a curved or eccentric lever acting upon a friction-pulley and the handle of the knife.

The accompanying drawing illustrates the combination of the parts of this cheese-cutter.

On a suitable base, A, there is a revolving circular table, B, adapted to the size of an ordinary cheese. The circumference of this table can be provided with pins, perforations for shifting the pins, or lines graduated with an index or point, $b$, on the base A, in order to gage the slice to be cut. There are two vertical posts, C and D, on said base. These posts have brace-rods I from the several pivots at their upper ends, as shown. The long handle E of the knife G is affixed by a pivot in the short post D, and extends beyond the upright post C, which latter has an open slot from near its base, which slot guides the said handle E and the eccentric or curved lever H, (with its handle $h$,) and confines them to a vertical motion. This curved lever H has its fulcrum-pin in the head or upper end of the slotted post C, as shown. There is a link, F, affixed to the knife-handle E on each side, and the two sides of said link formed into a loop, which embraces the curved end of the lever H, and through which it slides on raising and depressing the lever, thereby raising and depressing the handle with its knife or cutting-blade G attached. The lower edge of this curved lever may be rounded to fit into the groove of a friction-pulley, $f$, held between the sides of the link F and upper edge of the knife-handle E.

The operation is simple: The cheese being laid on the table, the lever is raised, which, by its eccentric connection with the link and handle, raises the knife above the cheese, revolved to the desired position. The depression of the lever brings the knife vertically down, cutting a clean cut from the center to the circumference, the edge of the blade coming down parallel with the top of the table, severing the wedged slice perfectly.

I am aware that there are various devices for knives and levers for cutting bread, &c.; but I know of no knife for cutting cheese substantially like it.

What I claim as my invention is—

1. In combination with the posts C D the curved or eccentric lever H, link or loop F with its anti-friction pulley $f$, in connection with the handle E and knife G, all arranged on the base A, and operating substantially in the manner and for the purpose specified.

2. In combination with the devices of the first claim, I claim the revolving table B with its gage-marks around the circumference, and the index $b$ on the base A, when applied in the manner and for the purpose set forth.

JOHN W. ROW.

Witnesses:
 J. A. GUNDY,
 J. T. BAKER.